Oct. 22, 1929.　　　J. L. ROBBINS　　　1,732,280
INCUBATOR
Filed July 11, 1927　　2 Sheets-Sheet 1

Inventor
John L. Robbins.
By [signature]
Attorney

Oct. 22, 1929.  J. L. ROBBINS  1,732,280
INCUBATOR
Filed July 11, 1927   2 Sheets-Sheet 2

Inventor
John L. Robbins.
By A. J. O'Brien
Attorney

Patented Oct. 22, 1929

1,732,280

UNITED STATES PATENT OFFICE

JOHN L. ROBBINS, OF EDGEWATER, COLORADO

INCUBATOR

Application filed July 11, 1927. Serial No. 204,673.

This invention relates to improvements in incubators.

It is the object of this invention to produce an incubator of large capacity that shall be provided with means for producing a thorough circulation of the air contained therein and to thereby maintain a uniform distribution of heat and moisture, among the hatching trays.

It is another object of this invention to produce an incubator in which the section in which the hatching takes place shall be removed from the incubation sections so that the eggs that are undergoing incubation will not become soiled from droppings from the eggs that are hatching.

I have found that if the air is circulated by means of beaters or fans that circulate about the hatching trays that there will be a central zone in which the air is quiescent and that in this zone the greatest number of deaths occur among the chicks.

I have also found that if the reels or circulating fans are supplemented by propellers that tend to move the air longitudinally through the incubator or if the reels are replaced by one or more sets of such propellers that a higher percentage of live chicks are obtained under conditions otherwise the same.

The reasons for the improved results may be explained as follows:

During the process of artificial incubation many chicks die in the shells at various stages of development. Some die very early and others at more advanced stages of development, while many of the chicks die just before pipping or breaking the shell open. All of the dead chicks that die before the eighteenth day will, of course, remain among the eggs in the incubation trays until the trays are removed to the hatching section. When the trays are removed from the incubation section to the hatching section, any eggs that obviously contain dead chicks are removed but if the operator is in doubt the egg or eggs are left until after all of the live chicks are hatched.

It is evident that the dead chicks that remain in the heated cabinet at a temperature of 100–103 degrees F. will soon begin to decompose and to give off poisonous gases which, if not removed, will injuriously affect the other chicks.

It is therefore essential for the best results that the air shall be made to circulate throughout all of the parts of the incubating section.

As intimated above, I employ propellers or fans located at the ends of the incubation section which blow the air longitudinally of the trays and which, therefore, produce a circulation at all joints of this section.

In addition to the improved means of effecting the desired circulation, I have also arranged the parts so that the hatching section is located at one end of the incubator so that droppings from the eggs during the hatching will not fall upon any of the eggs in the incubation trays for when this occurs the droppings seal the pores in the egg shells and kill the chicks. Another advantage that is gained by having the hatching trays in one end of the incubator is that the gases from the shells that contain the dead chicks will not come into contact with the eggs under incubation and that therefore they will not deleteriously affect the latter.

In order to more fully and clearly describe my invention reference will now be had to the accompanying drawings in which the invention has been illustrated and in which.

Figure 1:
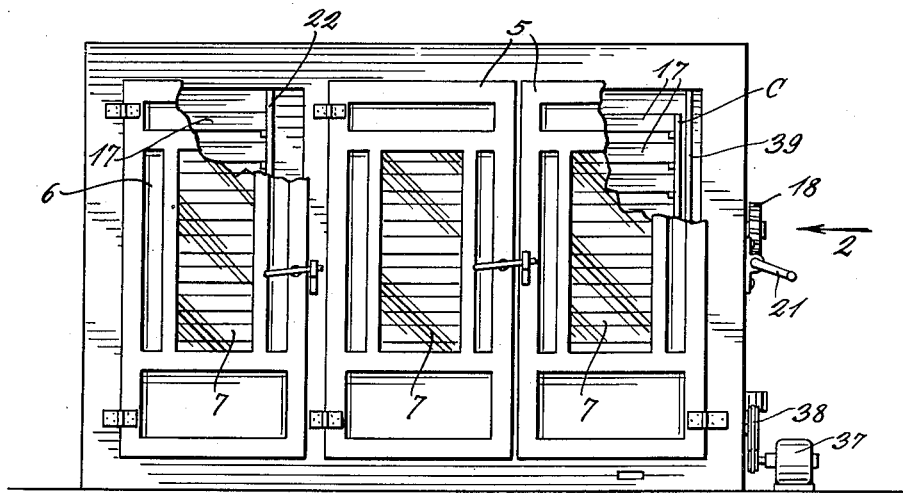
Fig. 1 is a front elevation of my improved incubator, portions being broken away to better disclose the construction.
Figure 3:
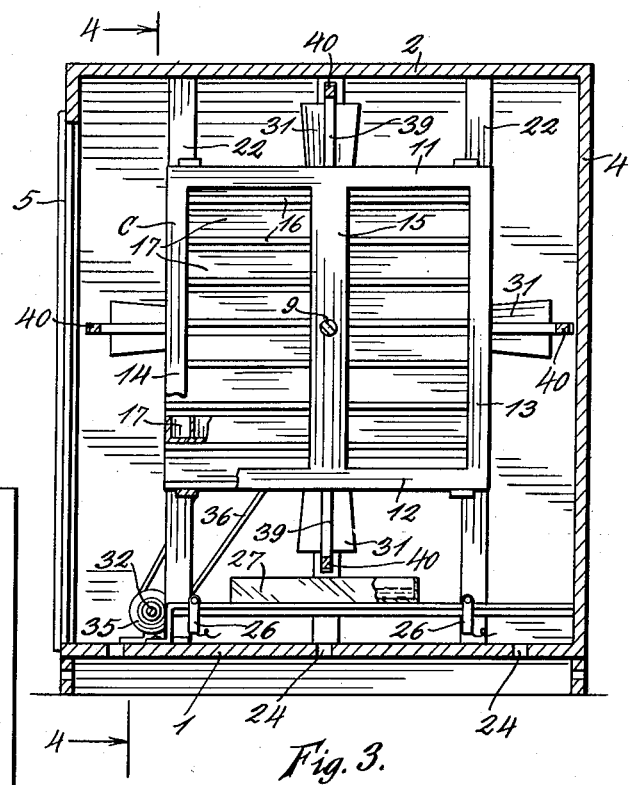
Fig. 3 is a transverse section taken on line 3—3, Fig. 4.
Figure 2:
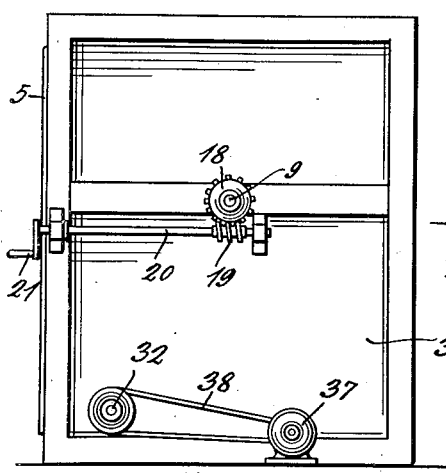
Fig. 2 is an end elevation looking in the direction of arrow 2, Fig. 1.

My improved incubator consists of a cabinet having a bottom 1, a top 2, ends 3, 3 and a back 4. The front of this cabinet is formed from three doors, 5, 5 and 6, which are each provided with a transparent glass panel 7. A beam 8 extends transversely of the interior of the cabinet and forms a support for one end of the shaft 9. A similar bar 10 extends transversely of one end of the cabinet and forms a bearing for the other end of shaft 9. Secured to shaft 9 so as not to rotate thereon are three rectangular frames A, B and C. These frames may be constructed in any suitable manner but have been shown as consisting of a rectangular frame formed from four pieces 11, 12, 13 and 14 and a central bar 15 that connects the top and the bottom members 11 and 12. (Fig. 3). Frames A and C have cleats 16 on their inner surfaces and the frame member B has similar cleats on both sides. Egg trays 17 are slidably mounted on these cleats. Since the frames are rectangular the trays may all be of the same size so that they will be interchangeable and will all have the same capacity. The outer end of shaft 9 has a worm gear 18 that is engaged by a worm 19 on the shaft 20. The outer end of shaft 20 has a crank 21 by which it may be rotated. When shaft 20 is rotated shaft 9 and the frames A, B and C will be rotated; by this means the eggs are moved from one angular inclination to another. The frames A, B, and C and the trays 17 constitute the incubation section where the eggs are kept the first eighteen or nineteen days of the incubation period. Adjacent the other end of the cabinet are three uprights 22, 22, 22. A plurality of parallel horizontal cleats 23 are secured to one side of the uprights 22 and similar cleats are secured to the inside of the cabinet and these cleats form supports for the trays 17 after they are removed from the incubation section. By removing the eggs to the hatching section after the eighteenth day, the danger of having the eggs under incubation soiled from droppings from the hatching eggs is removed.

It will be observed that I have provided the bottom with a plurality of air inlets 24 near the end opposite from the hatching section and with air exits 25 directly over the hatching section. Electric heaters 26 and a water pan 27 are also provided underneath the tray supports. The heaters are controlled by thermostats in the usual manner.

It is evident that unless some means is provided for agitating the air the distribution of the heat and the moisture will be very unequal and therefore the percentage of eggs hatched will be very low. It is therefore essential to provide means for agitating and circulating the air and I have provided the following means for this purpose.

Figure 4:
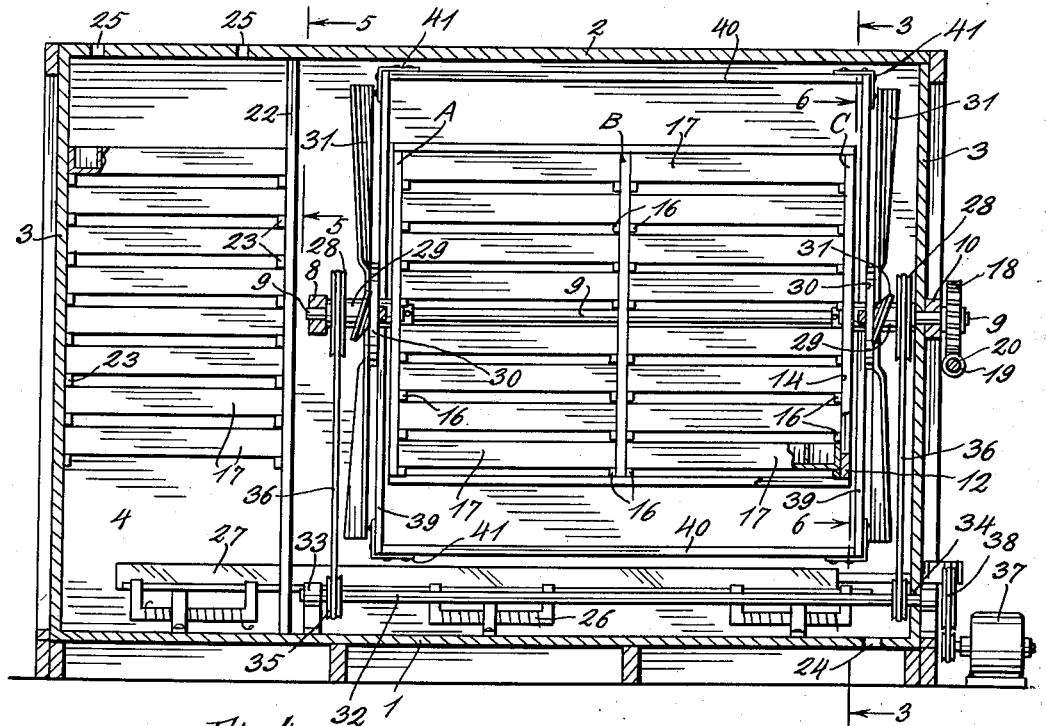
Fig. 4 is a longitudinal section taken on line 4—4, Fig. 3.
Figure 5:
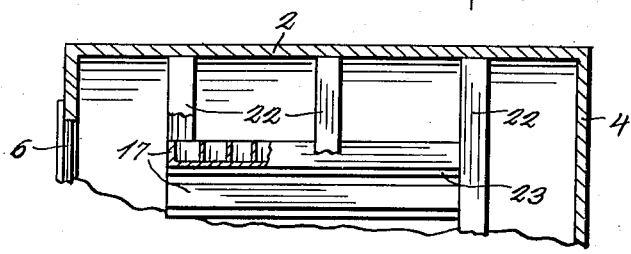
Fig. 5 is a fragmentary section taken along line 5—5, Fig. 4.
Figure 6:
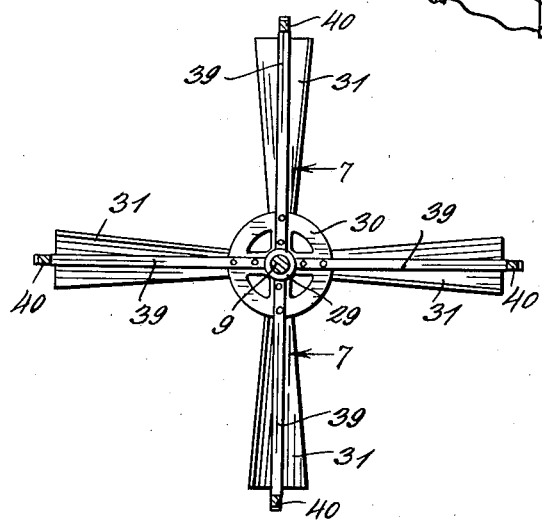
Fig. 6 is a section taken on line 6—6, Fig. 4.
Figure 7:
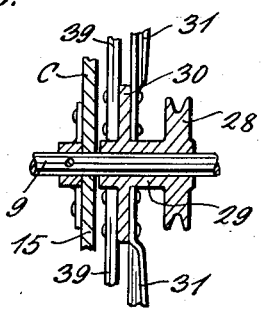
Fig. 7 is a section taken on line 7—7, Fig. 6.

Rotatably mounted on the shaft 9 at each end of the incubator section are two pulleys 28 that are provided with elongated hubs 29. Extending from each hub is a circular flange 30 to which one or more pairs of propeller blades 31 are secured. A drive shaft 32 is mounted for rotation in suitable bearings 33 and 34 and carries two pulleys 35. Belts 36 extend from pulleys 35 to the corresponding pulleys 28. A motor 37 is located outside of the cabinet and transmits power to the shaft 32 by means of a belt 38. When the motor operates the propellers are rotated in such a direction that they cause the air to flow from right to left (Fig. 4). Since frames A, B and C are open air will flow between the trays 17 and thereby produce a thorough circulation of the air at all parts of the incubation tray support. Some fresh air will enter through the openings 24 and some air will leave through openings 25, thereby maintaining the air within the cabinet clean and fresh. The propellers will naturally produce quite a stream of air and this makes it necessary for the air to circulate which requires that the air must flow in one direction along the center of the cabinet and in the other direction along the sides of the cabinet. There is therefore a continuous constant circulation that serves to distribute the heat and moisture uniformly among the eggs. I have shown two sets of propellers but it may be possible to omit one set.

If it should be found desirable to more thoroughly mix the air, an agitator may be provided. For this purpose I have shown four arms 39 secured to each of the circular flanges 30 and the ends of these arms are connected by blades 40 which are secured to the arms by means of angle irons 41. The blades 40 cause an agitation or stirring of the air that serves to more completely distribute the heat and moisture. The agitator or reel comprising the arms 39 and blade 41 is not considered to be essential but may be employed in addition to the propellers and when so employed the combination is highly effective as the propellers produce the flow of air longitudinally of the cabinet while the blades 40 serve to intimately mix or intermingle the heated air and moisture so as to obtain a uniform mixture.

I desire to call attention particularly to the fact that the section where the hatching takes place is separated entirely from the section where incubation takes place. This keeps the eggs in the incubator section free from the dirt and offensive gases incident to the hatching and also makes it possible to work with the hatching trays without interfering with the incubator section.

Having described my invention what I claim as new is:

1. An incubator including a heated cabinet equipped with egg holding means, and means for maintaining a uniform temperature in all parts of the cabinet, said means comprising an agitator traveling around the egg holding means and a propeller rotatable about the longitudinal axis of said agitator.

2. An incubator comprising, in combination, a horizontal elongated cabinet having a top, a bottom and two ends, an egg holding means for supporting a plurality of trays of eggs during the incubation period, a second egg holding means for supporting the trays during the hatching period, said last named means being located near one end of the cabinet the cabinet being provided with air exit openings in the top above the hatching tray support and with air intake openings in the bottom near the other end of the cabinet, a propeller mounted for rotation about an axis extending longitudinally of the cabinet and means for rotating the propeller so as to cause the air to flow from the intake to the outlet openings.

In testimony whereof I affix my signature.

JOHN L. ROBBINS.